US011488222B2

(12) United States Patent
Benkreira et al.

(10) Patent No.: US 11,488,222 B2
(45) Date of Patent: Nov. 1, 2022

(54) SYSTEMS AND METHODS FOR SMS E-COMMERCE ASSISTANT

(71) Applicant: Capital One Services, LLC, McLean, VA (US)

(72) Inventors: Abdelkader Benkreira, McLean, VA (US); Joshua Edwards, McLean, VA (US); Michael Mossoba, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 52 days.

(21) Appl. No.: 17/195,252

(22) Filed: Mar. 8, 2021

(65) Prior Publication Data

US 2021/0192591 A1    Jun. 24, 2021

Related U.S. Application Data

(63) Continuation of application No. 16/157,045, filed on Oct. 10, 2018, now Pat. No. 10,943,278, which is a
(Continued)

(51) Int. Cl.
*G06Q 30/00* (2012.01)
*G06Q 30/06* (2012.01)
(Continued)

(52) U.S. Cl.
CPC ..... *G06Q 30/0613* (2013.01); *G06F 16/9566* (2019.01); *G06K 9/6215* (2013.01);
(Continued)

(58) Field of Classification Search
CPC .......... G06Q 30/0613; G06Q 30/0605; G06Q 30/0641
See application file for complete search history.

(56) References Cited

U.S. PATENT DOCUMENTS 7,376,591 B2 *  5/2008  Owens ............... G06Q 30/0277
                                                            705/26.8
7,606,762 B1 * 10/2009  Heit ..................... G06Q 40/123
                                                            705/30
(Continued)

OTHER PUBLICATIONS

Wilder, C. (1998). Agents go price shopping. Internetweek, (744), PG23. Retrieved from https://search.proquest.com/docview/226917643?accountid=14753.*

*Primary Examiner* — Kathleen Palavecino
(74) *Attorney, Agent, or Firm* — Perkins Coie LLP

(57) ABSTRACT

The disclosed embodiments provide systems and methods for purchasing items using an e-commerce shopping assistant. In one embodiment, the system includes a processor to perform operations for receiving an electronic message comprising a web address from a user's mobile device via SMS, accessing a web page using the web address, identifying an item for purchase based on the content of the web page, retrieving the user's account information based on an identifier of the mobile device, wherein the account information comprises user preferences and user profile information, identifying merchants from which to purchase the identified item, selecting a merchant from the identified merchants based on the user preferences, configuring the purchase transaction based on the user preferences and the user profile information, and completing the purchase transaction at a merchant system of the selected merchant.

20 Claims, 8 Drawing Sheets

Related U.S. Application Data continuation of application No. 16/156,826, filed on Oct. 10, 2018, now Pat. No. 10,621,655.

(51) Int. Cl.

| | | |
|---|---|---|
| *G06Q 20/34* | (2012.01) | |
| *G06K 9/62* | (2022.01) | |
| *G06N 3/08* | (2006.01) | |
| *G06F 16/955* | (2019.01) | |
| *G06Q 20/12* | (2012.01) | |
| *G06V 10/40* | (2022.01) | |
| *G06K 7/14* | (2006.01) | |
| *G06F 40/20* | (2020.01) | |
| *G06V 30/10* | (2022.01) | |

(52) U.S. Cl.
CPC ............... *G06N 3/08* (2013.01); *G06Q 20/12* (2013.01); *G06Q 20/351* (2013.01); *G06Q 30/0605* (2013.01); *G06Q 30/0641* (2013.01); *G06V 10/40* (2022.01); *G06F 40/20* (2020.01); *G06K 7/1413* (2013.01); *G06V 30/10* (2022.01)

(56) References Cited

U.S. PATENT DOCUMENTS

| | | | | |
|---|---|---|---|---|
| 8,295,863 | B1* | 10/2012 | Gupta | H04W 4/60 705/26.81 |
| 2010/0122283 | A1* | 5/2010 | Button | G06Q 30/02 705/26.1 |
| 2014/0046794 | A1* | 2/2014 | Vallery | G06Q 30/0631 705/26.7 |
| 2015/0154678 | A1* | 6/2015 | Fonte | G02C 13/005 705/26.5 |
| 2015/0356622 | A1* | 12/2015 | Dhawan | G06Q 30/0269 705/14.66 |
| 2018/0150869 | A1* | 5/2018 | Finnegan | G06Q 30/0239 |

\* cited by examiner

SYSTEMS AND METHODS FOR SMS E-COMMERCE ASSISTANT

CROSS-REFERENCE TO RELATED APPLICATIONS

This application is a continuation of U.S. patent application Ser. No. 16/157,045, filed Oct. 10, 2018, which is a continuation of U.S. patent application Ser. No. 16/156,826, filed Oct. 10, 2018, the content of each application is incorporated herein in its entirety by reference.

BACKGROUND

Consumers are increasingly shopping online using e-commerce platforms rather than traditional brick-and-mortar stores. Additionally, as mobile devices become more ubiquitous, these consumers are increasingly relying on their mobile devices to browse online shopping catalogues and conduct their shopping online. In response to the ubiquity of mobile device usage, many e-commerce platforms provide interfaces and web sites that are "mobile-friendly" and designed for use on small screens and/or touch screens. However, existing e-commerce platforms often fall short of the customer's expectations.

For example, existing e-commerce platforms require users to go through a lengthy checkout process while shopping on their mobile devices. Additionally, many e-commerce platforms require users to create accounts or enable guest checkouts, where users must enter a large volume of information and go through multiple steps to complete their purchases. These lengthy processes create impediments to completing purchases online, resulting in many users conducting their mobile shopping from only a few stores or platforms where they have registered accounts. Additionally, many e-commerce platforms do not expose an Application Programming Interface (API), further adding complexity and impediments to purchasing online, and limiting the number of merchants from which users can effectively conduct online shopping.

Additionally, users sometimes have only a name, title, or image of the product they wish to purchase, and must search for the product to find a merchant that offers it for sale. In some instances, the product may come as a recommendation from another web site, such as a review site. This can add multiple cumbersome steps to the online shopping experience, particularly when using mobile devices.

Additionally, e-commerce platforms are often not secure, because merchants associated with e-commerce platforms fail to maintain the security of their e-commerce platforms. For example, merchants often fail to upgrade their e-commerce platforms, fix security flaws within their e-commerce platforms, and/or follow a policy of pushing only tested and secure changes of the e-commerce platform to the production environment (e.g., the production environment is where software and other products are actually put into operation for their intended uses by end users). This can result in exposure of sensitive financial and/or personal information.

Moreover, existing e-commerce platforms often do not allow users to purchase goods and services on the Internet according to their preferences. Since most e-commerce platforms sell goods or services from only a single merchant, users are often deprived of the opportunity to buy goods and services, for example, at the lowest price from a wide array of merchants. And, even if an existing e-commerce platform offers the goods or services from multiple merchants, the e-commerce platform and/or its merchants are often aware of the prices at which other merchants are selling their goods and services. Thus, the e-commerce platform and/or merchants often collude, for example, to maintain a high price for a product. Additionally, users that want convenient and easy online shopping based on their preferences and saved account information (e.g. financial accounts, etc.) need to create multiple accounts to shop on different e-commerce platforms. Accordingly, these e-commerce systems may provide less desirable outcomes for users.

In view of these and other shortcomings and problems, a need exists to provide improved systems and techniques that allow users to conveniently purchase items from e-commerce platforms using their mobile devices and according to their preferences.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments address the numerous disadvantages of existing systems by providing a system for purchasing items using an e-commerce shopping assistant. For example, the disclosed embodiments reduce security flaws by utilizing secure and encrypted connections for transmitting sensitive data to merchant platforms. Additionally, the disclosed embodiments reduce theft of financial account information and enable users to securely shop online with a wide variety of merchants by providing virtual credit card accounts to complete purchases. The disclosed embodiments provide a way to communicate with multiple e-commerce platforms by providing methods for purchasing items at merchants that do not expose APIs. Additionally, the disclosed embodiments provide methods for identifying items for purchase using a variety of convenient methods, such as by receiving web addresses, textual descriptors, or images from a user. The disclosed embodiments further provide methods for identifying items for purchase from non-ecommerce websites, such as social media forums or review articles. The disclosed embodiments also provide a way to automatically purchase goods and services from particular merchants securely on the Internet according to users' preferences. That is, the disclosed embodiments may determine particular merchants to purchase a good or service from without receiving a specific selection of the merchants from users.

Aspects of the disclosed embodiments may also include a method or a non-transitory tangible computer-readable medium that stores software instructions that, when executed by one or more processors, are configured for and capable of performing and executing one or more of the methods, operations, and the like consistent with disclosed embodiments.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
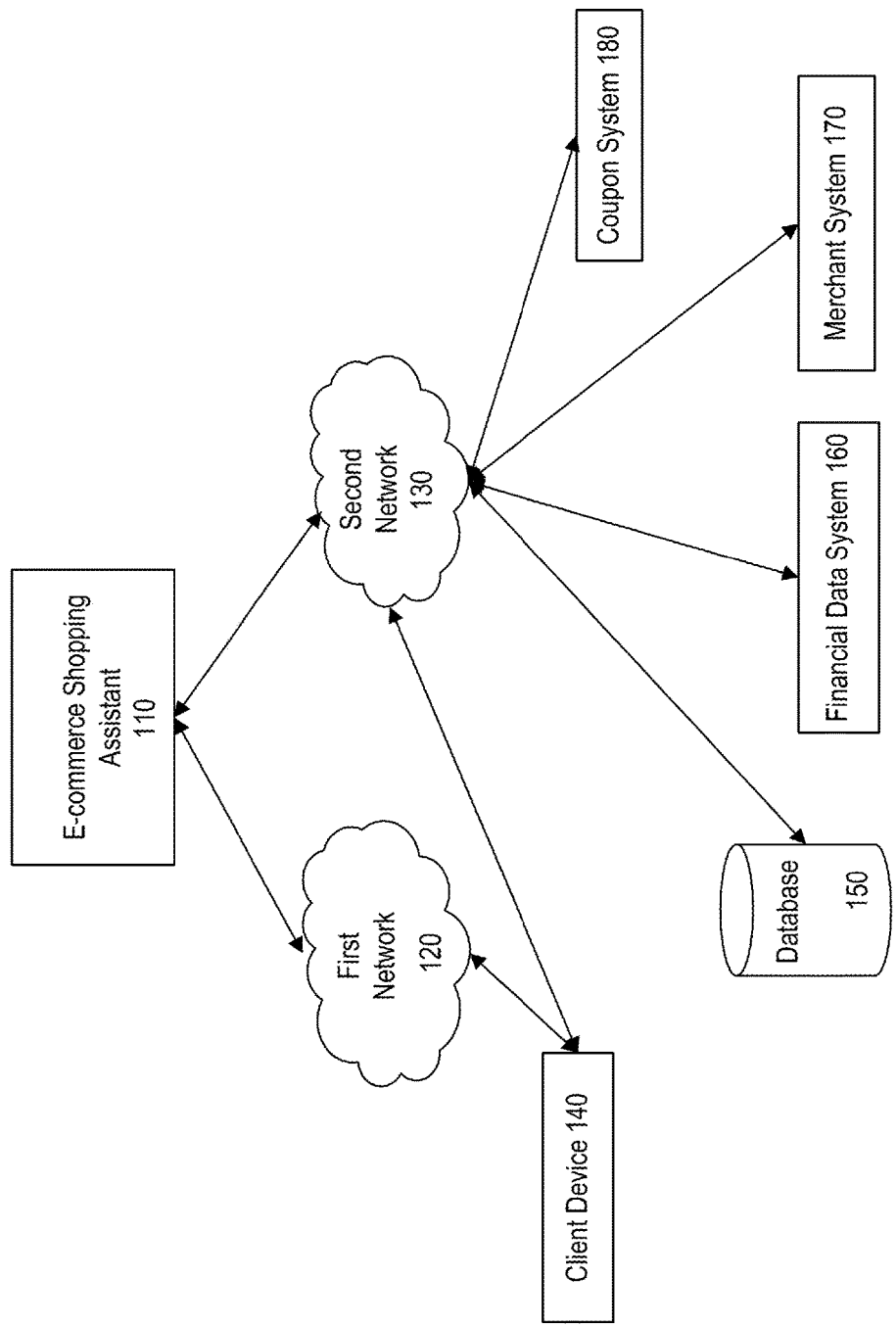
FIG. 1 is a block diagram of an exemplary e-commerce shopping assistant system, consistent with disclosed embodiments.

The disclosed embodiments generally relate to systems and methods for purchasing items online using an e-commerce shopping assistant. As an example, the disclosed embodiments may involve a scenario where a user intends to purchase a particular item. The user may be browsing a website online using a client device, such as a mobile phone, and find an item that she intends to buy. The user may use the mobile phone to send an electronic message, such as a short message service (SMS) text message, to an e-commerce shopping assistant. Specifically, the user sends the shopping assistant an SMS message containing a Uniform Resource Locator (URL) pointing to a webpage containing the desired item. Alternatively, the message may contain an image (such as a screenshot) of the desired item, or an item identifier associated with the item, such as an item name, text, or universal product code (UPC).

After receiving the message, the shopping assistant may identify the desired item for purchase. For example, if the message includes a URL, the shopping assistant may access the webpage and identify the desired item based on an analysis of the content of that webpage (e.g., using web scraping, optical character recognition (OCR), natural language analysis, or machine learning algorithms). If the message includes an image, the shopping assistant may identify the item using various image analysis techniques. Alternatively, the shopping assistant may identify the item based on the item identifier in the message. In some instances, the shopping assistant may transmit a message to the user's mobile device, requesting confirmation of the identified item.

Once the shopping assistant identifies the item, it proceeds to identify a particular merchant from which to purchase the item. The shopping assistant may access the user's shopping assistant account and retrieve the user's account information to assist in identifying a merchant. For example, the user's account information may include user preferences providing a list of preferred merchants or attributes related to merchants, price preferences, price limits, shipping preferences, etc. that the shopping assistant may use to identify a merchant. After identifying the merchant, the shopping assistant may proceed with a purchase flow that includes connecting with the merchant's system to place an order for the item. The user's account information may further include user profile information that the shopping assistant uses to complete the purchase (e.g., financial account information, shipping preferences, etc.). The shopping assistant may then generate a confirmation message or electronic receipt for transmission to the mobile device. In this manner, the shopping assistant enables users to purchase items from various merchants using a single, convenient, and secure platform.

In some embodiments, the shopping assistant may search a database for applicable coupons that may be applied towards the purchase, prior to completing the purchase. Additionally, in some embodiments, the shopping assistant may communicate with a financial data system associated with the financial account disclosed in the user's account information and request generation of a virtual credit card account. The virtual credit card account may be generated specifically for the particular merchant, for the final purchase price, or for a certain amount of time, and used to complete the purchase.

The following detailed description encompasses the scenario above as well as many other scenarios. The detailed description also refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

As used herein, the term "image" may connote digital information stored in an appropriate format, for example, static image formats (e.g., bitmap, Graphics Interchange Format ("GIF"), Portable Network Graphics format ("PNG"), Joint Photographic Experts Group ("JPEG")) or dynamic and/or video formats (e.g., animated GIF, MPEG-4, AVI, MP4, Flash Video ("FLV"), Windows Media Video ("WMV")).

As used herein, the term "item" may include any product, good, or service, whether digital or tangible.

As used herein, the terms "shopping assistant account," "shopping assistant user account," and "registered account" refer to a user's shopping assistant account. Further, the term "user account information" refers to the information associated with the user's shopping assistant account.

FIG. 1 is a block diagram of an exemplary system 100 for purchasing items using a client device, consistent with disclosed embodiments. The components and arrangements shown in FIG. 1 are not intended to limit the disclosed embodiments, as the components used to implement the disclosed processes and features may vary.

In accordance with disclosed embodiments, system 100 may include an e-commerce shopping assistant 110, a client device 140, a database 150, a financial data system 160, a merchant system 170, and a coupon system 180. As shown in FIG. 1, system 100 may include a first network 120 connecting client device 140 to e-commerce shopping assistant 110. System 100 may further include a second network 130, connecting each component of system 100. In other embodiments components of system 100 may be connected directly with each other, without networks 120, 130. Other components known to one of ordinary skill in the art may be included in system environment 100 to gather, process, transmit, receive, acquire, and provide information used in conjunction with the disclosed embodiments. In addition, system environment 100 may further include other components that perform or assist in the performance of one or more processes that are consistent with disclosed embodiments.

Client device 140 may include one or more computing devices configured to perform operations consistent with disclosed embodiments. For example, client device 140 may include at least one of a smart phone, a laptop, a netbook, a tablet, a multifunctional watch, a pair of multifunctional glasses, a gaming device, a wearable computing device, or other type of mobile computing device. Client device 140 may include one or more processors configured to execute software including instructions stored in memory, such as memory included in client device 140. When executed by a processor, the software performs Internet-related communication and content display processes. For instance, client device 140 may execute web browser software that generates and displays interfaces including content on a display device included in, or connected to, client device 140. Client device 140 may execute applications that allow client device 140 to communicate with components over networks 120, 130, and generate and display content in interfaces via a display device included in client device 140.

The disclosed embodiments are not limited to any particular configuration of client device 140. For instance, client device 140 can be a device that stores and executes mobile applications that interact with shopping assistant 110, database 150, financial data system 160, merchant system 170, and/or coupon system 180 to perform aspects of the disclosed embodiments. In certain embodiments, client device 140 may be configured to execute software instructions relating to location services, such as GPS locations. For example, client device 140 may be configured to determine a geographic location and provide location data and time stamp data corresponding to the location data. In yet other embodiments, client device 140 may capture images. Client device 140 is further described below in connection with FIG. 2.

Database 150 may include one or more computing devices configured to store and/or provide information to one or more of shopping assistant 110, client device 140, financial data system 160, merchant system 170, and/or coupon system 180. In some aspects, such information can include user account information associated with a shopping assistant account, as described further with respect to FIG. 3. Database 150 may include, for example, one or more Oracle™ databases, Sybase™ databases, or other relational databases or non-relational databases, such as Hadoop™ sequence files, HBase™, or Cassandra™. Database 150 may include computing components (e.g., database management system, database server, etc.) configured to receive and process requests for data stored in memory devices of the database and to provide data from the database.

While database 150 is shown separately, in some embodiments database 150 may be included in or otherwise related to one or more of shopping assistant 110, client device 140, and/or financial data system 160. Database 150 may be configured to collect, store, and/or maintain user account information from shopping assistant 110, client device 140, financial data system 160, merchant system 170 and/or coupon system 180. Database 180 is further described below in connection with FIG. 3.

Financial data system 160 may be a system associated with a financial service provider (not shown), such as a bank, a credit card company, a lender, brokerage firm, or any other type of financial service entity that generates, provides, manages, maintains financial service accounts, manages transaction cards, etc., for users. Financial data system 160 can generate, maintain, store, provide, and/or process financial data associated with one or more financial accounts. Financial data system 160 can expose, in some embodiments, an application programming interface (API) that provides one or more methods for obtaining financial account information to requesting computing systems. For example, a requesting computing system can provide financial data system 160 with a financial account number via the API, and financial data system 160 can provide the requesting computing system with the name, address, expiration date, issuing bank, or other information associated with the financial account number.

Financial data system 160 may be one or more computing systems that are configured to execute software instructions stored on one or more memory devices to perform one or more operations consistent with disclosed embodiments. For example, financial data system 160 may include memory devices storing data and software instructions and processors configured to use the data and execute the software instructions to perform server-based functions and operations known to those skilled in the art. Financial data system 160 may include one or more general-purpose computers, mainframe computers, or any combination of these types of components. In some embodiments, financial data system 160 may have an application installed thereon to perform processes that are consistent with disclosed embodiments.

Financial data system 160 may include or may access one or more storage devices configured to store data and/or software instructions used by one or more processors of financial data system 160 to perform operations consistent with disclosed embodiments. For example, financial data system 160 may include memory configured to store one or more software programs that perform several functions when executed by a processor. The disclosed embodiments are not limited to separate programs or computers configured to perform dedicated tasks. For example, financial data system 160 may include memory that stores a single program or multiple programs. Additionally, financial data system 160 may execute one or more programs located remotely from financial data system 160. For example, financial data system 160 may access one or more remote programs stored in memory included with a remote component that, when executed, perform operations consistent with disclosed embodiments. In certain aspects, financial data system 160 may include server software that generates, maintains, and provides services associated with transaction card management. In other aspects, financial data system 160 may connect separate servers or similar computing systems that generate, maintain, and provide services associated with financial data for a financial service provider associated with financial data system 160.

Merchant system 170 may include one or more computing components configured to perform operations for initiating, processing, and/or completing a transaction. Merchant system 170 may also be associated with a merchant that provides goods and/or services via known online or e-commerce type of solutions. For example, such a merchant may sell goods via a website using known online or e-commerce systems and solutions to market, sell, and process online transactions. Merchant system 170 can be a computing device that is controlled and operated by a merchant that provides products (e.g., goods and/or services) that consumers (i.e., end-users or other business entities) can purchase, consume, or use. Merchant system 170 may be an e-commerce website enabling the purchase of goods and/or services. Merchant system 170 may include a point of sale (POS) terminal, which can be a dedicated POS terminal or a software application (i.e. back- and/or front-end computing components) that can configure a general-purpose computing device to accept financial account card payments.

Merchant system 170 may include one or more servers or other type of computing systems configured to execute software instructions stored in memory to perform one or more processes consistent with disclosed embodiments. For example, merchant system 170 may include one or more memory devices storing data and software instructions and one or more processors configured to use the data and execute the software instructions to perform server-based functions and operations known to those skilled in the art. In some embodiments, merchant system 170 may have an application installed thereon to perform one or more processes that are consistent with disclosed embodiments.

Merchant system 170 may include servers that are configured to execute stored software instructions to perform operations associated with a merchant, including processes associated with handling purchase transactions, generating transaction data, generating item data (e.g., an item identifier, item name, item description, etc.) relating to purchase transactions, etc. Merchant system 170 may include one or more servers that may be a general-purpose computer, a mainframe computer, or any combination of these components. In certain embodiments, merchant system 170 (or a system including merchant system 170) may be configured as an apparatus, system, or the like based on the storage, execution, and/or implementation of the software instructions that perform one or more operations consistent with disclosed embodiments. Merchant system 170 may be standalone or part of a subsystem included in a larger system. For example, merchant system 170 may include distributed servers that are remotely located and communicate over a network.

Coupon system 180 may be a system including one or more computing components configured to store, categorize, update, and retrieve coupons or discount codes for a variety of merchants and/or products. A coupon includes any incentive or discount that may be applied towards a product, and may be embodied as a code, barcode, QR code, or other type of data. Coupon system 180 may include storage for storing and accessing an inventory of coupons. In some embodiments, coupon system 180 includes computing components configured to test the validity of the stored coupons, update the status of stored coupons, search for and update the inventory with new coupons, identify relevant coupons, and generate and/or retrieve coupons.

Networks 120, 130 may be any type of network configured to provide communications between components of system 100. For example, networks 120, 130 may be any type of network (including infrastructure) that provides communications, exchanges information, and/or facilitates the exchange of information, such as the Internet, a Local Area Network, near field communication (NFC), optical code scanner, cellular network, text messaging systems (e.g. SMS, MMS) or other suitable connections that enables the sending and receiving of information between the components of system 100. In some embodiments, one or more components of system 100 can communicate through networks 120, 130. In various embodiments, one or more components of system 100 may communicate directly through one or more dedicated communication links.

Shopping assistant 110 may be one or more computing systems including one or more processors that are configured to execute software instructions stored on one or more memory devices to perform one or more operations consistent with disclosed embodiments. Shopping assistant 110 may communicate with client device 140 via first network 120 (for e.g. via a text messaging network). Shopping assistant 110 may also communicate via second network 130 to one or more of client device 140, database 150, financial data system 160, merchant system 170, and coupon system 180. Shopping assistant 110 may include memory devices storing data and software instructions and processors configured to use the data and execute the software instructions to perform server-based functions and operations known to those skilled in the art. Shopping assistant 110 may include one or more general-purpose computers, mainframe computers, or any combination of these types of components.

Shopping assistant 110 may be configured as a particular apparatus, system, and the like based on the storage, execution, and/or implementation of the software instructions that perform operations consistent with disclosed embodiments. Shopping assistant 110 may be standalone, or it may be part of a subsystem included in a larger system. For example, shopping assistant 110 may include distributed servers that are remotely located and communicate over a network (e.g., networks 120, 130). In some embodiments, shopping assistant 110 may have an application installed thereon to perform processes that are consistent with disclosed embodiments. Parts of shopping assistant 110, such as computing systems and/or functionality as described below, may be implemented by and/or on client device 140, financial data system 160 and/or merchant system 170, which may include being implemented in an application installed on client device 140, financial data system 160 and/or merchant system 170.

Shopping assistant 110 may aggregate data from one or more of client device 140, database 150, financial data system 160, merchant system 170, and/or coupon system 180. In some embodiments, shopping assistant 110 may provide a user interface or platform to enable a user of client device 140 to provide registration information for the shopping assistant account, user account information, transaction card information, or any other information to enable shopping assistant 110 to perform one or more methods and/or techniques consistent with disclosed embodiments. Shopping assistant 110 may authorize a user and/or client device 140 to make one or more purchases via shopping assistant 110.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art based on the teachings contained herein. Such alternatives fall within the scope and spirit of the disclosed embodiments.

Figure 2:
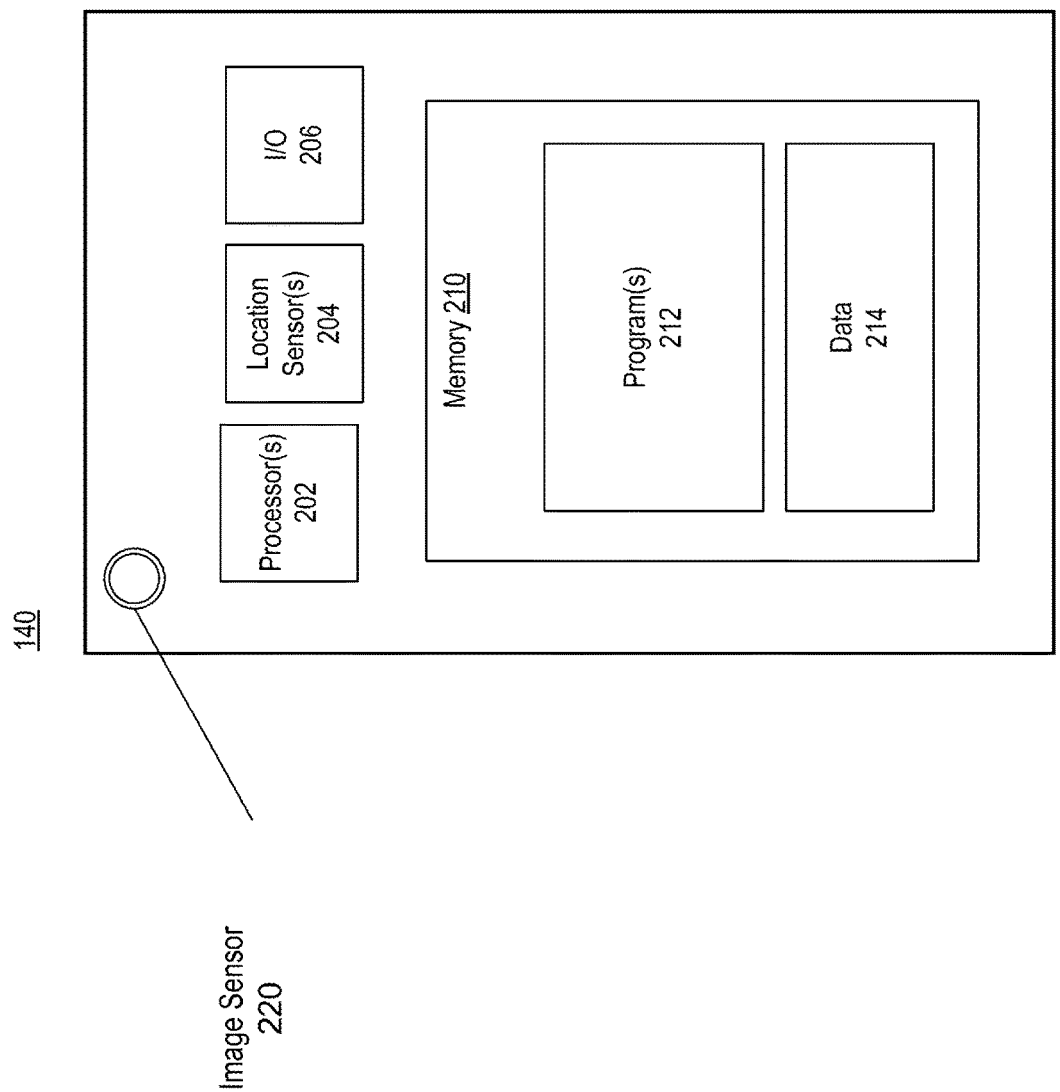
FIG. 2 is a block diagram of an exemplary client device, consistent with disclosed embodiments.

FIG. 2 is a block diagram of client device 140, consistent with disclosed embodiments. In one embodiment, client device 140 may include a processor 202, a location sensor 204, an input/output (I/O) system 206, and a memory 210. In some embodiments, client device 140 may take the form of a mobile computing device (e.g., a wearable device, smartphone, tablet, laptop, or similar device). According to some embodiments, client device 140 may be configured to provide a web browser or similar computing application capable of accessing web sites, consistent with disclosed embodiments. Client device 140 may also be configured to provide a text messaging application capable of generating, transmitting, receiving, and viewing text messages, consistent with disclosed embodiments.

Processor 202 may include one or more known processing devices, such as microprocessors manufactured by Intel™, NVIDIA™, or various processors from other manufacturers. As would be appreciated by one of skill in the art, the disclosed embodiments are not limited to a particular processor type. Memory 210 may include one or more storage devices configured to store instructions for performing operations related to disclosed embodiments. For example, memory 210 may be configured with one or more software components, such as program(s) 212, that when executed by processor 202, can cause client device 140 to perform operations consistent with the disclosed embodiments. The disclosed embodiments are not limited to separate programs or computers configured to perform dedicated tasks. For example, client device 140 can be configured to perform the disclosed functions of client device 140 by one or more programs stored in memory 210 (e.g., program 212). In some embodiments, memory 210 can be configured to store data 214 used by one or more programs 212. In some embodiments, program 212 may implement functions of e-commerce shopping assistant 110.

Location sensor 204 may include sensor(s) and/or system(s) capable of determining a location of client device 140, such as a Global Positioning System (GPS) receiver, Bluetooth transceiver, or WiFi transceiver. When location sensor 204 includes multiple sensors and/or systems, client device 140 can be configured to determine geographic coordinates or identifiers, such as latitude or longitude, based on data provided from multiple sensor(s) and/or system(s). Client device 140 can be configured to send the geographic coordinates or identifiers determined by location sensor 204 to other components of system 100 via, for example, network 170.

I/O system 206 may include one or more devices configured to allow data to be received and/or transmitted by client device 140 and to allow client device 140 to communicate with other machines and devices, such as other components of system 100. For example, I/O system 206 may include a screen for providing information to the user. I/O system 206 may also include components for NFC communication. I/O system 206 may also include one or more digital and/or analog devices that allow a user to interact with client device 140 such as a touch-sensitive area, buttons, or microphones. I/O system 206 may also include one or more accelerometers to detect the orientation and inertia of client device 140. I/O system 206 may also include a fingerprint scanner, a retinal scanner, or other biometric sensor. I/O system 206 may also include other components known in the art for interacting with shopping assistant 110.

In some embodiments, client device 140 may include an image sensor 220 (e.g., a digital camera). Image sensor 220 can be configured to generate data representing still images or video and send it to other components of system 100 via, for example, networks 120, 130.

The components of client device 140 may be implemented in hardware, software, or a combination of both hardware and software, as will be apparent to those skilled in the art.

Figure 3:
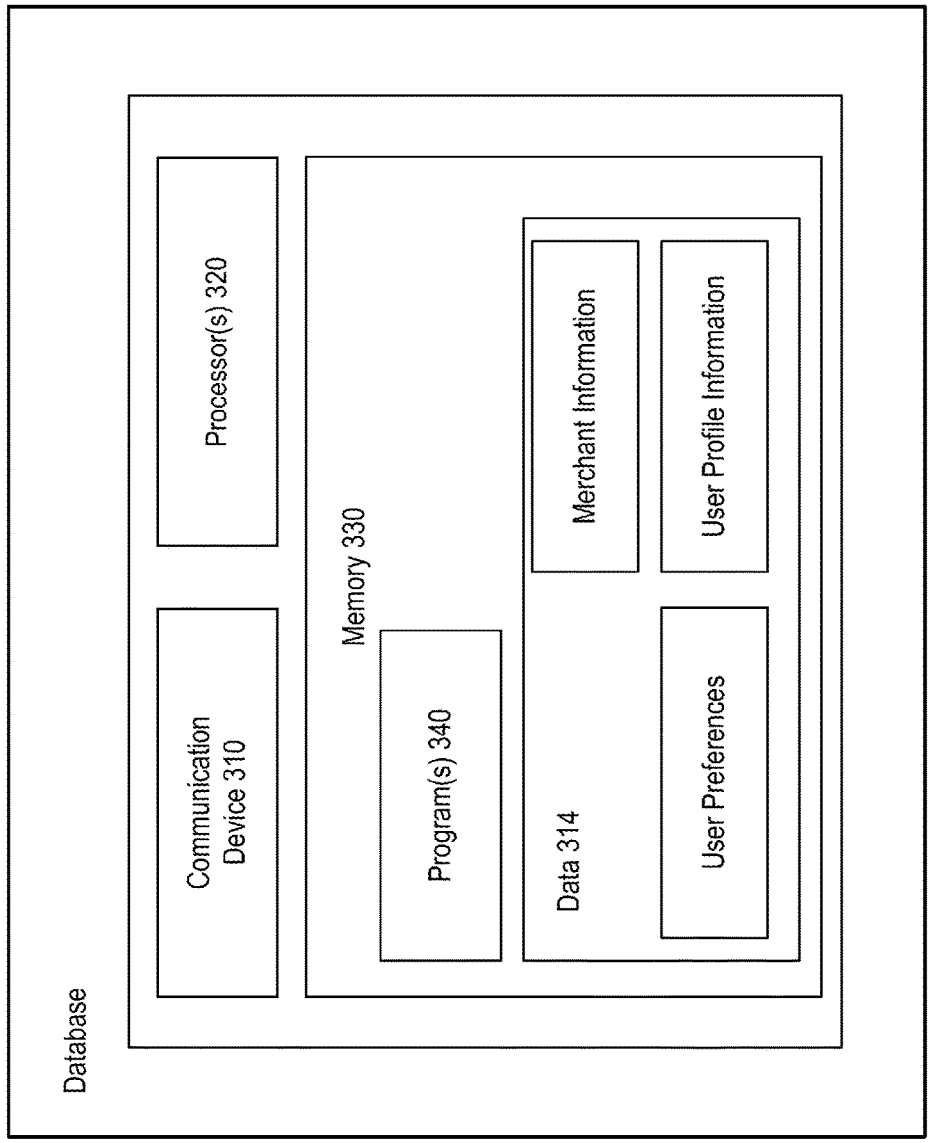
FIG. 3 is a block diagram of an exemplary database, consistent with disclosed embodiments.

FIG. 3 is a block diagram of an exemplary database 150, consistent with disclosed embodiments. Database 150 may include a communication device 310, one or more database processors 320, and database memory 330 including one or more database programs 340 and data 350. In some embodiments, database 150 may take the form of servers, general purpose computers, mainframe computers, or any combination of these components. Other implementations consistent with disclosed embodiments are possible as well.

Communication device 310 may be configured to communicate with one or more components of system 100, such as shopping assistant 110, client device 140, financial data system 160, merchant system 170, and/or coupon system 180. In particular, communication device 310 may be configured to provide, to shopping assistant 110, user account information associated with a shopping assistant user account that may be used to assist the shopping assistant in performing operations consistent with embodiments described herein.

Database processors 320, database memory 310, database programs 312, and data 314 may take any of the forms described above for processors 202, memory 210, programs 212, and data 214, respectively. The components of database 150 may be implemented in hardware, software, or a combination of both hardware and software, as will be apparent to those skilled in the art. For example, although one or more components of database 150 may be implemented as computer processing instruction modules, all or a portion of the functionality of database 150 may be implemented instead in dedicated electronics hardware.

Data 314 may include account information associated with a shopping assistant user account for shopping assistant 110, such as user preferences and user profile information. User profile information may include financial account data for one or more user financial accounts, a billing address, a shipping address, an email address, user login credentials (e.g. username and passcode), a shopping assistant account number, a name, an age, demographic information, and a mobile device identifier. The mobile device identifier may link the shopping assistant user account to a particular mobile device (or to multiple mobile devices), and may include a unique mobile identifier, a phone number, an IP address, MAC address, or device type. User profile information may also include user information that is needed to purchase certain categories of items, such as clothing sizes (e.g., user measurements, sock size, hat size, shirt size, pant size, etc.), footwear/shoe sizes, color preferences, and the like.

User preferences may include a list of preferred merchants, a ranking of merchants, merchant selection criteria, shipping type preferences, shipping speed preferences, price preferences (e.g., preferences to purchase items at the most or least expensive price), using the most or least expensive shipping method, or pricing limits/thresholds. Merchant selection criteria includes factors that enable the shopping assistant to select between a plurality of merchants, and may include factors such as the merchant geographic location, merchant's geographic proximity to the user's location or shipping address, the merchant's inventory status for the item, the item price, coupon availability for the particular merchant, or shipping speed.

Shipping speed preferences may be tied to certain categories. For example, for a first categories of products a first shipping speed may be selected, and for a second category of products a second shipping speed may be selected. As an example, the user may select "priority shipping" for products related to baby care supplies (e.g., diapers, baby wipes, etc.), and may select "ground shipping" for products related to sports supplies (e.g., soccer balls, sportswear, etc.). User preferences may also include interests, hobbies, favorite items, movies, etc. In some aspects, database 150 may include other user information needed for the processes described below in connection with FIGS. 4-7. In some aspects, database 150 includes authentication or security information relating to one or more of the user financial accounts, such as login credentials, unique identifiers, security codes, addresses, passcodes, or other such information.

Data 314 may further include merchant information. Merchant information may include information about particular merchants associated with merchant system 170. For example, merchant information may include merchant identifiers, merchant account information, forms of payment the merchant accepts, and/or the like. Merchant information may also include one or more merchant profiles or data associated with one or more merchant web sites, such as authentication data for connecting and logging into a particular merchant website (e.g., using techniques associated with open authentication, such as OAuth™, OpenID™, SAML™, etc.). When a user initiates a purchase transaction via shopping assistant 110, the shopping assistant 110 may analyze merchant data or merchant profiles before providing or authorizing the purchase transaction on behalf of the user.

In some embodiments, database 150 may include components of coupon system 180. For example, data 314 may include a database record for an inventory of coupons for a variety of merchants and/or products. In some embodiments, database 150 includes computing components configured to test the validity of the stored coupons, update the status of stored coupons, search for and update the inventory with new coupons, identify relevant coupons, and generate and/or retrieve coupons for use with shopping assistant 110, in accordance with disclosed embodiments.

Figure 4:
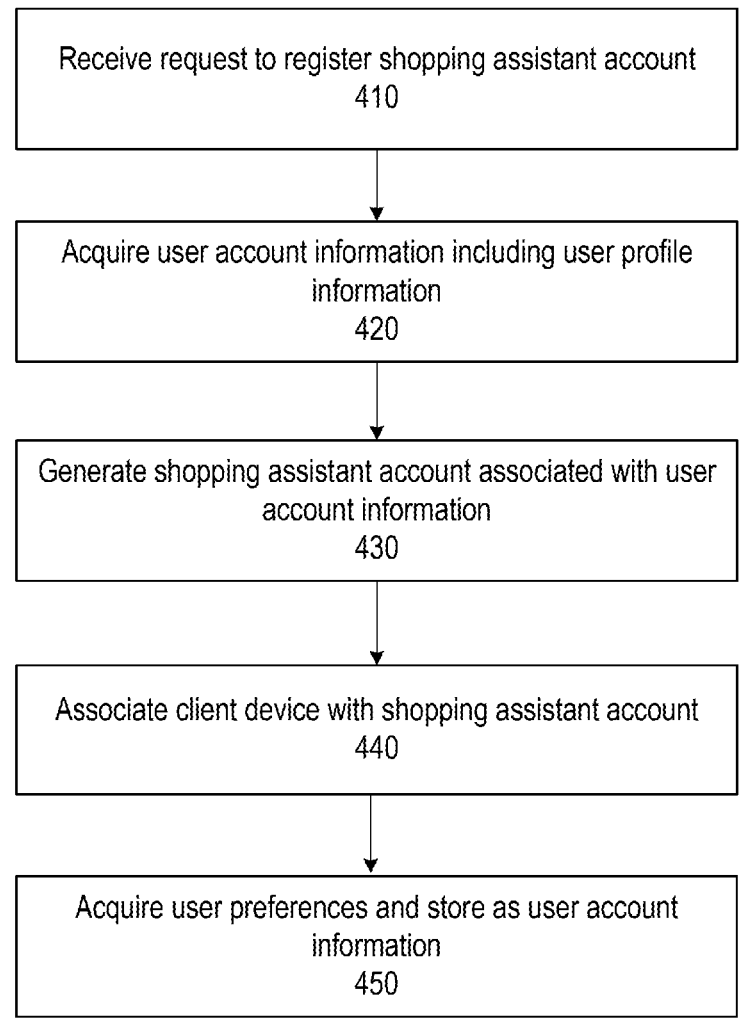
FIG. 4 is a flowchart illustrating an exemplary user registration process, consistent with disclosed embodiments.

FIG. 4 is a flowchart illustrating an exemplary user registration process 400 in accordance with disclosed embodiments. In some embodiments, a processor of, for example, shopping assistant 110, may execute instructions encoded on a computer-readable storage medium to perform steps of user registration process 400. It should also be understood, however, that one or more steps of user registration process 400 may be implemented by other components of system 100 (shown or not shown), including client device 140, financial data system 160, and/or merchant system 170.

At step 410, shopping assistant 110 may receive a request from a user to register a shopping assistant user account for the shopping assistant 110. The request may be received from client device 140 or any other computing system. For example, shopping assistant 110 may provide a portal to client device 140 or any other computing system associated with the user.

At step 420, shopping assistant 110 may acquire (e.g., request and receive) user account information associated with the user. In some embodiments, shopping assistant 110 may using a native text messaging application on client device 140 to create a secure method of acquiring sensitive information from the user. For example, shopping assistant 110 may transmit a text message with a hyperlink via first network 120. The hyperlink may open a web client (such as a browser) and create a secure websocket to enable communication between the web client and shopping assistant 110. The web socket may create an encrypted connection enabling sensitive user account information (such as financial account information, addresses, etc.) to be transmitted securely. In some embodiments, shopping assistant 110 creates a secure websocket for all communications with client device 140.

User account information for the shopping assistant account may include user profile information and/or user preferences as disclosed above with respect to database 150. In some embodiments, shopping assistant 110 may acquire one or more of the user login credentials by creating the credentials automatically; in other embodiments, shopping assistant 110 may acquire one or more of the user login credentials by acquiring input from the user. The user login credentials may allow shopping assistant 110 to provide secure, subsequent uses when a particular user accesses the shopping assistant 110, for example, to update the user account information for the shopping assistant account. In some embodiments, shopping assistant 110 may acquire the user account information when a user employs the client device 140 to communicate with shopping assistant 110.

Shopping assistant 110 may acquire user account information from the user (e.g., via client device 140). Additionally or alternatively, shopping assistant 110 may acquire user information from any other computing system, such as financial data system 160. For example, shopping assistant 110 may request and receive user information, which may include financial account information from the user. In some embodiments, shopping assistant 110 may receive information from the user that allows the shopping assistant 110 to interface with and receive information from one or more financial data systems 160 for which the user is a customer.

The financial data may include the identity of the financial service account provider, the identity of a financial service account, and/or credentials that enable shopping assistant 110 to access, receive, and/or store information relating to the user's financial account. In some embodiments, shopping assistant 110 may utilize open source technology, such as OAuth™, OpenID™, SAML™, etc., that provides open authentication between different devices, websites, applications, and/or systems.

In some embodiments, shopping assistant 110 may use the financial data to communicate with financial data system 160 to configure a communication protocol and/or link that enables shopping assistant 110 to transmit and/or receive information to/from the financial data system 160 relating to purchase transactions made by the user. In some embodiments, the user may provide the shopping assistant 110 with authorization to directly access financial service account information. For example, shopping assistant 110 may be a part of financial data system 160, and may directly access (i.e., access without user log-in credentials) data stores of the user's financial service providers(s), including data stores associated with the user's financial account information.

As another example, shopping assistant 110 may acquire user information from merchant system 170. In some embodiments, shopping assistant 110 may receive information from the user that allows the shopping assistant 110 to interface with and receive information from one or more merchant systems 170.

At step 430, shopping assistant 110 may generate a shopping assistant user account associated with the user account information. Shopping assistant 110 may use the user account information to create, update, edit, or otherwise manage a secure platform for purchasing items according to disclosed embodiments.

At step 440, shopping assistant 110 may use the user account information to associate an identifier of the user's client device with the shopping assistant user account. For example, shopping assistant may associate the phone number or another unique identifier of the user's mobile device with the user's shopping assistant account. The association facilitates communication between the mobile device and the shopping assistant 110, for example, via first communications network 120. In some embodiments, shopping assistant 110 may identify the user and access the user's shopping assistant account when receiving an electronic message from the user's mobile device based on the associated unique identifier.

At step 450, shopping assistant 110 may acquire one or more user preferences. User preferences may include preferences as described above with respect to database 150. User preferences may be determined by acquiring the preferences from client device 140 via user input.

Additionally or alternatively, user preferences may also be acquired by using one or more similar techniques for acquiring user information, as described, for example, in step 420. In some embodiments, some categories of user preferences may also be acquired based on determining the most common preferences of a group of users utilizing shopping assistant 110. For example, some categories of user preferences (such as the list of preferred merchants, a ranking of merchants, merchant selection criteria, shipping type preferences, shipping speed preferences, price preferences (e.g., preferences to purchase items at the most or least expensive price), using the most or least expensive shipping method) may be set to default values that are established by determining the most common preferences for those categories among other users of shopping assistant 110 that share similar demographics. Additionally or alternatively, user preferences may also be acquired along with user account information (acquired at step 420) or the request (received in step 410). At step 450, shopping assistant 110 may store and associate the user preferences with the shopping assistant user account.

Figure 5:
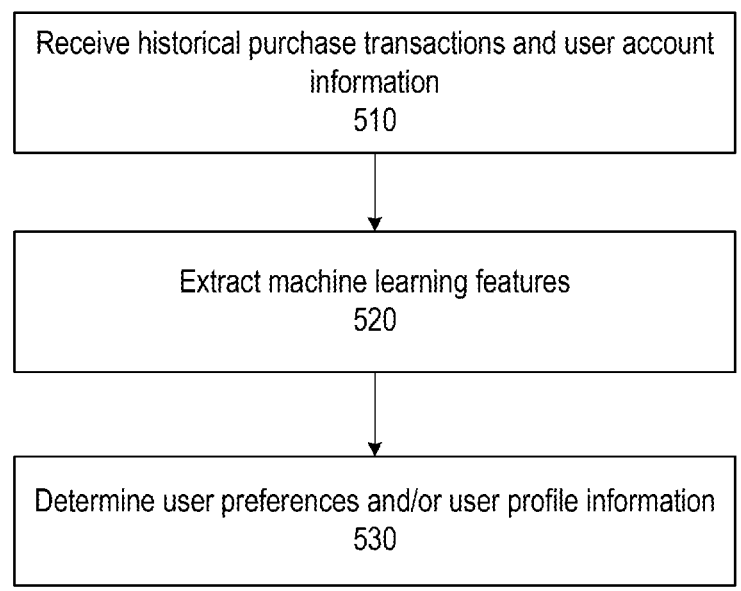
FIG. 5 is a flowchart illustrating an exemplary method for using a machine learning processor to determine user preferences, consistent with disclosed embodiments.

Referring now to FIG. 5, in some embodiments, shopping assistant 110 may determine user preferences and/or user profile information based on machine learning and one or more historical purchase transactions processed by shopping assistant 110. For example, at step 510 of process 500, shopping assistant 110 may train a machine learning model using information on historical purchase transactions made by the user and/or user account information. In some embodiments, the information on historical purchase transactions includes information on items that the user has purchased and merchants where the user has made transactions. At step 520, shopping assistant 110 may be configured to extract machine learning features from the user's historical purchase transactions and/or user account information. In some embodiments, these features can be extracted by inputting the historical purchase transactions and user account information into a first convolutional neural network. The first convolutional neural network can be configured to output the machine learning features. Shopping assistant 110 can extract user preferences and/or user profile information from the machine learning features. In some embodiments, these features can be extracted by inputting the machine learning features into a classifier, such as a second convolutional neural network. In some embodiments, the second convolutional neural network can be distinct from the first convolutional neural network. The second convolutional neural network can be configured to output indications of the user preference and/or profile information. At step 530, shopping assistant 110 can be configured to determine a user preference or a data point for the user profile based on the extracted machine learning features. For example, shopping assistant 110 maybe configured to determine the user's shoe size based on the machine learning model, and store the determined shoe size as part of the user's profile.

Figure 6:
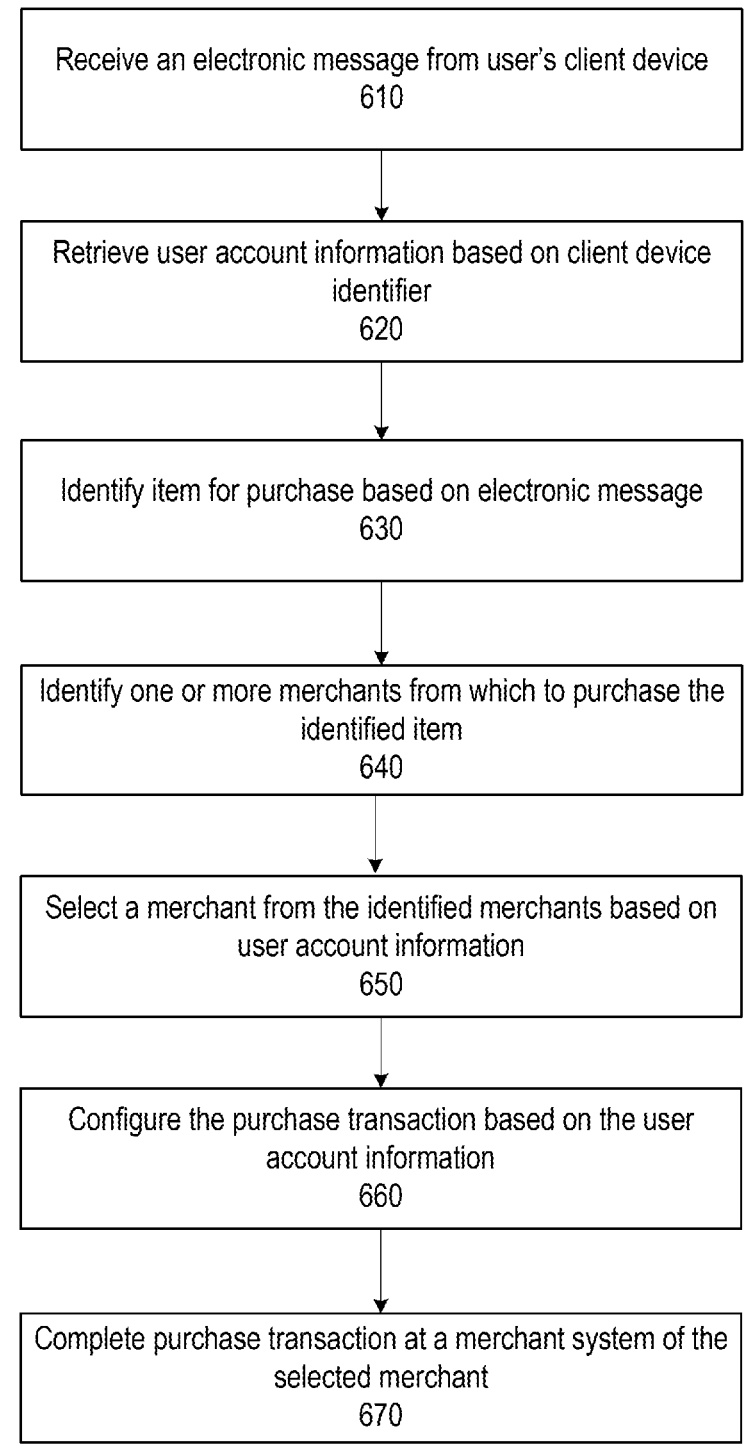
FIG. 6 is a flowchart illustrating an exemplary process for purchasing items, consistent with disclosed embodiments.

FIG. 6 is a flowchart illustrating an exemplary process 600 for purchasing an item, in accordance with disclosed embodiments. In some embodiments, method 600 is implemented by shopping assistant 110. For example, shopping assistant 110 may include a processor for executing instructions encoded on a computer-readable storage medium to perform the steps of process 600. It should also be understood, however, that one or more steps of process 600 may be implemented by other components of system 100 (shown or not shown), including client device 140, financial data system 160, and/or merchant system 170.

At step 610, shopping assistant 110 may receive an electronic message from a client device associated with a user. For example, a user may be browsing a website, such as an e-commerce website, on a client device (e.g., client device 140). The user may find an item that the user wishes to purchase, and may send an electronic message to shopping assistant 110. In some embodiments, the user has registered for a shopping assistant account with shopping assistant 110, as described in FIG. 4. The user may send a text message to a dedicated phone number associated with the shopping assistant 110. In some aspects, the text message may include a web address, such as a Uniform Resource Locator (URL), pointing to a web page that includes the desired item. For example, the URL may point to a web page of an e-commerce shopping website that offers the desired item for sale. Alternatively, the text message may include text that identifies the desired item. For example, the text may include an item identifier, product code, or specific title. Alternatively, the text message may include an image, such as a screenshot of the product or a web page offering the product for sale. The contents of the electronic message and process of identifying the desired item based on the contents is described in greater detail with respect to FIG. 7.

At step 620, shopping assistant 110 may retrieve account information for the shopping assistant account associated with the user. For example, shopping assistant 110 may determine an identifier associated with the user's client device 140 and retrieve the user account information for the user's shopping assistant account based on the identifier. The identifier may be a unique mobile identifier, a phone number, an IP address, MAC address, or a device type associated with the user's shopping assistant account during registration (e.g., as discussed with respect to step 440). The user account information may include user profile information and user preferences, as discussed above with respect to database 150.

At step 630, shopping assistant 110 may identify the item the user desires to purchase. The item may be identified based on the content of the electronic message received at step 610. For example, the electronic message may be a text message that includes a URL. Shopping assistant 110 may access a web page based on the URL and identify the desired item. For example, the web page may be a web page of an e-commerce website that sells the item, or the web page may be an article reviewing the desired item. Alternatively, the electronic message may be a text message that includes a description of the desired item, such as a product name, model number, product code, or other textual descriptor of the item. As another alternative, the electronic message may be a text message that includes an image that may be used by shopping assistant 110 to identify the desired item. For example, the image may be a screenshot of a web page, such as the web pages described above with respect to the URL, or a screenshot of the textual description of the item as described above. As another example, the image may be a picture of the desired item itself, or a barcode or QR code pointing to the item on an e-commerce website. The contents of the electronic message and process of identifying the desired item based on the contents are further described with respect to FIG. 7.

In some embodiments, shopping assistant 110 may not find a match for the desired item, or alternatively may find an imprecise match for the desired item. In such instances, the shopping assistant 110 may send an electronic message to the user's client device 140, requesting further information that may be needed to identify the item. Alternatively, the shopping assistant 110 may transmit an electronic message to the user's client device 140 identifying one or more items that may match the desired item, and requesting confirmation that the item is the correct item desired by the user. In some aspects, the user may respond to the request with a textual response (e.g., a "yes" or "no") or may respond with an image. Shopping assistant 110 may be configured to identify an item or text in the image (e.g., using image recognition techniques discussed below with respect to FIG. 7), and extract a response to the request from the image.

Additionally, after identifying the item in step 630, shopping assistant 110 may request confirmation of the identified item. For example, shopping assistant 110 may transmit an electronic message to the user's client device 140 identifying the item and requesting confirmation that the item is the correct item desired by the user. In some aspects, shopping assistant 110 may be configured to wait for a response from client device 140 before proceeding to step 640. After sending the message, shopping assistant 110 may be configured to wait for a predetermined period of time for a response. For example, if shopping assistant 110 does not receive a response to the message within an hour, the purchase transaction may be saved as an "incomplete" transaction, as discussed further below at step 660.

At step 640, shopping assistant 110 may identify one or more merchants that offer the identified item and from which the identified item may be purchased. For example, once identified at step 630, shopping assistant 110 may conduct a search for the item and identify the specific merchants offering it for sale. Additionally or alternatively, shopping assistant 110 may have identified the item through a web page of an e-commerce shopping website offering the item for sale. In some embodiments, shopping assistant 110 may identify the merchant by scraping one or more electronic platforms associated with the merchant and/or another plurality of merchants. Shopping assistant 110 may identify one or more attributes, such as a price of the item offered by a merchant on one or more of the electronic platforms, in scraped data. Shopping assistant 110 may then identify the merchant based on the attributes, such as identifying the merchant based on the price being below a threshold, selecting the merchant based on the price being nonzero or defined, or based on the user preferences (e.g., merchant selection criteria, etc.).

At step 650, shopping assistant 110 may select a specific merchant from the identified one or more merchants of step 640. Shopping assistant 110 may determine the selection based on information retrieved from the user's shopping assistant account, including the user preferences and user profile information. For example, shopping assistant 110 make select a specific merchant based on the user preferences, including one or more of a list of preferred merchants, a ranking of merchants, merchant selection criteria, shipping type preferences, shipping speed preferences, price preferences (e.g., preferences to purchase items at the most or least expensive price), using the most or least expensive shipping method, or pricing limits/thresholds. As one example, the merchant may be selected based on the merchant being listed in the user's list of preferred merchants, the item being in stock, and the price being the lowest price available. As another example, the merchant may be selected based on the shipping speed available for shipping the item and the price being in the lower spectrum of prices at which the item is available (e.g., within the lower 10% of offered prices shopping assistant 110 identified). In some aspects, shopping assistant 110 may send an electronic message, such as a text message, to the user's client device 140 requesting confirmation from the user for the identified item and/or the selected merchant. As another example, the merchant may be selected based on data received from client device 140, such as location information (e.g., GPS data) received from sensor 204. The location information may be used to determine whether a merchant provides the longest, shortest, most expensive, and/or least expensive shipping method.

At step 660, shopping assistant 110 may connect to the merchant system 170, and configure the purchase transaction based on user account information associated with the shopping assistant account. For example, merchant system 170 may expose an application programming interface (API) that provides one or more methods for connecting to the merchant system 170. In some aspects, multiple API lookups may be required at different stages of process 600 (e.g., at step 660 to configure the product and step 670 to complete the purchase transaction).

Alternatively, merchant system 170 may not expose an API. In such case, shopping assistant 110 may use web scraping techniques on an electronic platform associated with the merchant system 170. Shopping assistant 110 may scrape an electronic document (e.g., a website) that is associated with the merchant. The electronic document may include a website used to buy items from the merchant. Shopping assistant 110 may identify an electronic transaction form in the electronic document. In some embodiments, shopping assistant 110 may identify the electronic form by identifying attributes of an electronic transaction form (e.g., the "form" Hypertext Markup Language tag, Cascading Style Sheet identifiers and/or classes identifying the styling for a form, etc.). Shopping assistant 110 may parse the electronic transaction form. In some embodiments, shopping assistant 110 may identify a field associated with the electronic form from the electronic transaction form.

Shopping assistant 110 may use scraped data (e.g., text, fillable fields, etc.) for automated web interaction to navigate through the electronic platform. For example, the automated web interaction may enable shopping assistant 110 to identify a search field, enter the item information (e.g., obtained at step 630), search for the item, parse through the results of the search, identify the item from the results (e.g., using textual analysis, tags, etc.), select the desired item, select the appropriate buttons to configure the transaction flow (e.g., adding the item to a cart, inputting user account information such as shipping address information and payment information, etc.), and complete the purchase of the item. Shopping assistant 110 may insert data (e.g., user account information) in identified fields using one or more computer programming languages, such as HTML or JavaScript. In some aspects, shopping assistant 110 may utilize open source technology for web scraping and performing the automated web interaction techniques discussed above.

In some aspects, shopping assistant 110 may configure the purchase transaction based on the user profile information to enter a shipping address and select a payment method for the transaction. As another example, the selected item may be a clothing item and configuring the purchase transaction may include selecting the size or color for the clothing item based on the user preferences. In some instances, shopping assistant 110 may configure the purchase transaction based on the user preferences. For example, shopping assistant 110 may select the shipping speed (e.g. next day, "priority", etc.) based on the user preferences.

In some aspects, shopping assistant 110 may determine that further information is required to configure the purchase transaction. As an example, the selected item may be a t-shirt available in various colors and sizes, and the user profile information may not include the user's preferred size and/or color. In such instances, shopping assistant 110 may send an electronic message, such as a text message, to the user's client device 140 with a query requesting the information needed to configure the transaction. After sending the message, shopping assistant 110 may be configured to wait for a predetermined period of time for a response. For example, if shopping assistant 110 does not receive a response to the message within an hour, the purchase transaction may be saved as an "incomplete" transaction. Such incomplete transactions may be stored as a separate list, such that the user may review the list at a later time and complete the transactions by supplying the required information. Shopping assistant 110 may be further configured to send reminders or alerts to the user device 140 at periodic times, requesting the information required to complete the transaction. For example, a message may be sent once a day requesting the information from the user. As another example, shopping assistant 110 may send a periodic electronic message to the user device 140 providing the list of incomplete transactions.

In some embodiments, shopping assistant 110 may search for coupons that may be applied towards the purchase transaction. For example, shopping assistant 110 may communicate with coupon system 180 or database 150 to search for applicable coupons. Shopping assistant 110 and/or coupon system 180 may be configured to search a coupon database for a coupon code, or receive/obtain from the coupon database a coupon code, that may be applied to the transaction. For example, a coupon code may be identified based on the item itself, the manufacturer, or the merchant. Shopping assistant 110 may then automatically apply the coupon prior to completing the purchase transaction, and may so inform the user.

In some embodiments, shopping assistant 110 may communicate with a financial data system 160 associated with the financial account disclosed in the user account information of the shopping assistant account, and request generation of a virtual credit card account. In some embodiments, shopping assistant 110 may generate the virtual credit card account automatically, based on an indication in the user preferences. In some embodiments, shopping assistant 110 may generate the virtual credit card account based on a security rating and/or reputation of the selected merchant. In some embodiments, components of shopping assistant 110 may be implemented within financial data system 160. The virtual credit card account may include a virtual account number, expiration date, and security code, that links directly to the user's real credit card account. The virtual credit card account, however, may provide an extra layer of protection. For example, the virtual credit card account may be a temporary credit card account generated for a specific merchant, for a specific amount, and/or for a specific amount of time. For example, shopping assistant 110 may generate the virtual account such that it may be processed only by the selected merchant and for the calculated final transaction price. Shopping assistant 110 may use the generated virtual credit card account to complete the purchase transaction.

At step 670, shopping assistant 110 may complete the purchase transaction at a merchant system of the selected merchant. In some aspects, shopping assistant 110 may send an electronic message to the user device 140 requesting confirmation of the transaction before completing the transaction. Alternatively, shopping assistant 110 may perform a confirmation step automatically, by comparing an image of the identified item to the original image transmitted at step 610 (e.g., using techniques discussed with respect to FIG. 7).

In some instances, shopping assistant 110 may determine that the item is out of stock at the selected merchant and thus unavailable for purchase. Here, shopping assistant 110 may return to step 650 and select a different merchant from the merchants identified at step 640. Alternatively, shopping assistant 110 may generate an electronic message to notify the user of client device 140 that the item is out of stock. Shopping assistant 110 may periodically check on the inventory of the item in an automated fashion, and purchase the item when it is back in stock or, alternatively, notify the user when the item is back in stock. For example, shopping assistant 110 may use web scraping techniques to determine if the item is back in stock (e.g., by determining if web page includes terms such as "in stock" or "available," determining if a button to purchase the item or add the item to a shopping cart is available or clickable, by attempting to add the item to a shopping cart and proceed through the purchase flow, or other similar methods).

In some embodiments, to complete the purchase transaction at step 670, shopping assistant 110 may communicate with a merchant system associated with the selected merchant and/or financial data system 160. In some aspects, shopping assistant may generate a payment token to complete the transaction. For example, the payment token may include data associated with the item, the merchant from which the item will be purchased, the form of payment used to purchase the item, the price of the item, and/or shipment of the item. Shopping assistant 110 may encrypt the payment token and/or data within the payment token. In some embodiments, shopping assistant 110 may encrypt some but not all of the data in the payment token. Shopping assistant 110 may then transmit the payment token to merchant system 170 to complete the transaction. Shopping assistant 110 may receive one or more notifications from the merchant. The notifications may indicate a success, failure, fraud, an error, and/or the like associated with the payment for the transaction. Additionally or alternatively, shopping assistant 110 may also generate an electronic receipt for the transaction, or receive an electronic receipt for the transaction from merchant system 170, and transmit the receipt to user device 140.

Figure 7:
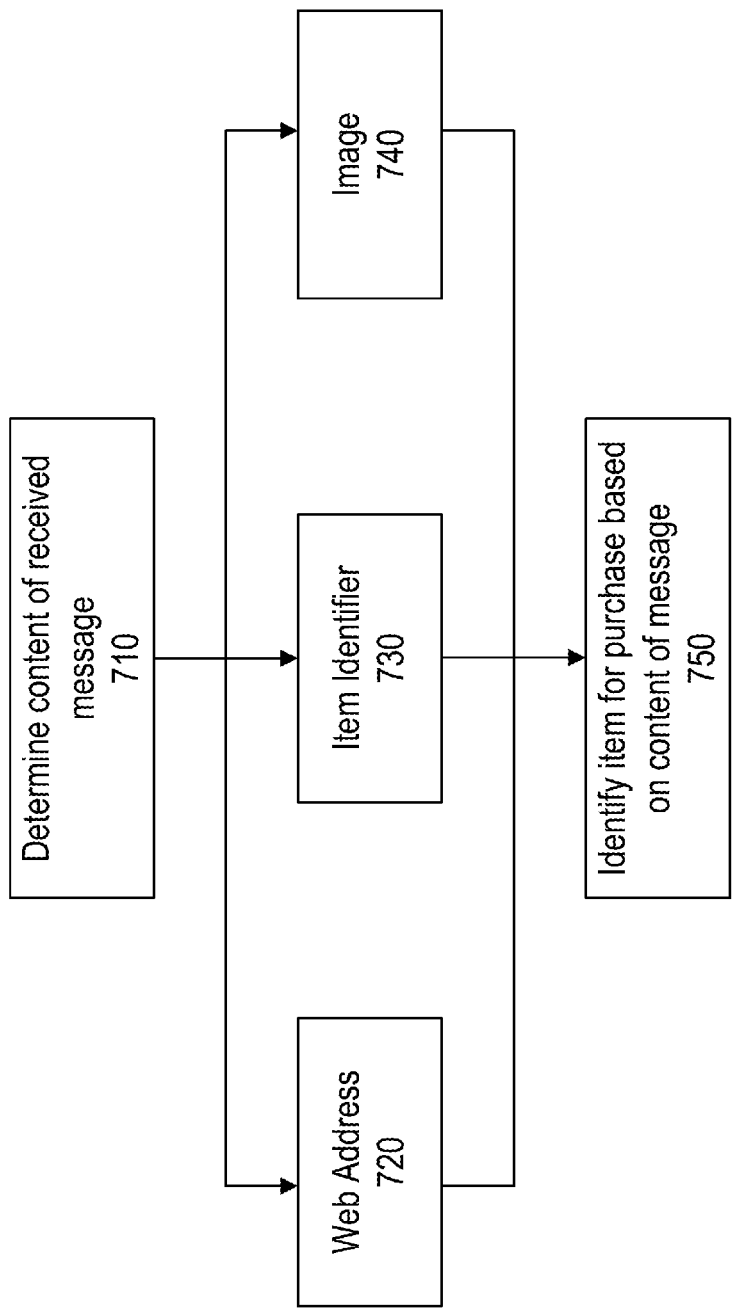
FIG. 7 is a flowchart illustrating an exemplary process for identifying an item, in accordance with disclosed embodiments.

FIG. 7 is a flowchart illustrating an exemplary process for identifying an item based on an electronic message, for example, a message received at step 610 of process 600. At step 710, shopping assistant 110 may determine the content of the message received at shopping assistant 110 via first network 120. For example, shopping assistant 110 may determine that the content of the message includes a web address at step 720, an item identifier at step 730, or an image at step 740. Based on the determined content, at step 750 shopping assistant 110 may then identify an item that the user wishes to purchase.

In some aspects, shopping assistant 110 may determine that the message includes a web address at step 720 or URL pointing to a webpage. For example, the electronic message may be a text message that includes a URL. Shopping assistant 110 may determine that the text message includes a URL by performing natural language processing of the text, searching for specific terms (e.g., "http" or ".com"), using an open source URL-detector, or other URL-detection techniques known to one of skill in the art. Shopping assistant 110 may access a web page based on the URL and identify the desired item based on the content of the web page. For example, the web page may be a web page of an e-commerce website that sells the item (e.g., a web page on Amazon or HomeDepot e-commerce platforms), or the web page may include an article or video reviewing the desired item, or alternatively, discussing the desired item (for e.g., in an online discussion or social media forum).

Shopping assistant 110 may identify the item from the content of the web page by using web scraping techniques to identify text, objects, etc. on the web page and identify the item described in the web page. In some aspects, shopping assistant 110 may extract machine learning features from the web page using a machine learning algorithm, such as a convolutional neural network, and input the extracted machine learning features into a classifier, such as another neural network. Additionally or alternatively, shopping assistant 110 may use various textual analysis techniques, such as natural language processing, density checks, or contextual text analysis to identify the item described in the web page. For example, the article may be a consumer review of a Samsung refrigerator. Shopping assistant 110 may use the above textual analysis techniques to determine the primary subject of the article as being a Samsung 4-Door French Door Refrigerator (e.g., by determining the primary subject, performing a density check on the text to identify the terms "Samsung" or "refrigerator," capitalization of terms, context of the terms and their usage, etc. to identify the item of interest).

In some aspects, shopping assistant 110 may determine that the message includes an item identifier at step 730. Shopping assistant 110 may use similar techniques as discussed with respect to step 720 to determine that the message includes an item identifier. The item identifier may include a universal product code (UPC), a stock keeping unit (SKU), a model number, a serial number, a product name, a product code, a title or textual description of the desired item (e.g., "Samsung 4-Door French Door Refrigerator in Stainless Steel"), or other identifier that points to the item. Shopping assistant 110 may identify the item associated with the identifier by utilizing the item identifier to search one or more databases, servers, and/or cloud services, conduct an internet look-up, use an application programmable interface, or perform any other techniques known by one of ordinary skill in the art. Thus, shopping assistant 110 may identify the item using the item identifier to look up the item.

In some aspects, shopping assistant 110 may determine at step 740 that the message includes an image. The user of client device 140 may capture the image via I/O 206, image sensor 220, or program(s) 212 (e.g., to capture a screenshot of the display) and transmit the image to shopping assistant 110 via first network 120. The image may be a screenshot of a web page, such as the web pages described above with respect to the URL at step 720, or a screenshot of the item identifier as described at step 730. As another example, the image may be an image of the desired item itself, or a barcode or QR code pointing to the item on an e-commerce website. In some embodiments, shopping assistant 110 may determine the text of the image using optical character recognition (OCR) or using one or more open-source and/or commercial applications, such as OCR applications. In some aspects, shopping assistant 110 may use a machine learning algorithm, such as a convolutional neural network, to extract one or more machine learning features. In some aspects, these features may indicate characteristics of the item depicted in the image such as a logo, a shape of the item, a color of the item, text depicted on the item, an overall shape of the item (e.g., its front profile, rear profile, side profile, overhead profile, etc.), or similar characteristics. In various aspects, the features can indicate characteristics of the image, such as a particular arrangement of pixels, a particular color shift, a bounding box size of an object in the image, a shape of an object in the image, or the like. Shopping assistant 110 may determine attributes of the item based on the extracted features and use a machine learning algorithm to identify the item.

In some aspects, if shopping assistant 110 determines at step 740 that the message includes an image of a barcode, shopping assistant 110 may determine the UPC from the barcode image (e.g., using the techniques described above). The UPC may be determined by comparing the image of the barcode to a set of stored images of the barcodes by searching one or more databases, servers, and/or cloud services, conducting an internet look-up, utilizing an application programmable interface, or using any other techniques known by one of ordinary skill in the art. Shopping assistant 110 may utilize open-source and/or commercial applications to determine the UPC code from the captured image, such as a barcode reader and/or scanner application. After determining the UPC code, shopping assistant 110 may then identify an item associated with the item identifier based on the UPC.

As another example, if shopping assistant 110 determines that the message includes an image of a QR code, shopping assistant 110 may determine a UPC, an SKU, an internet address, and/or another associated item identifier from the image of the QR code (e.g., using the techniques described above). In some embodiments, shopping assistant 110 may utilize open-source and/or commercial applications to determine the UPC, SKU, internet address, and/or another item identifier from the image of the QR code, such as a QR reader and/or scanner application. After determining the UPC, SKU, internet address, and/or another item identifier, shopping assistant 110 may then identify an item associated with the item identifier. In some embodiments, shopping assistant 110 may determine text from the image in the received message. In some embodiments, shopping assistant 110 may determine the text of the image using optical character recognition (OCR) or using one or more open-source and/or commercial applications, such as OCR applications.

In some embodiments, the message may include an image of the product itself at step 740. Shopping assistant may determine if there is any text within the image to aid in identifying the product (e.g., using techniques discussed above), and additionally may perform an image search by conducting an internet look-up, using an application programmable interface, or performing any other techniques known by one of ordinary skill in the art to conduct an image search. For example, shopping assistant 110 may perform a comparison of the received image to images in a database or online resource, and the comparison may be performed using machine learning features extracted from the original image and the images in the database/online resource. Shopping assistant 110 can be configured to determine that the original image and the one or more retrieved images are similar when the comparison satisfies a matching criterion. In some aspects, the image may be a video (e.g., a video of a product), and shopping assistant 110 may determine image, sound, and text from the video by using one or more techniques to capture the image, sound, and text from the video. Shopping assistant 110 may determine the image, sound, and text from the video using one or more open-source and/or commercial applications. Although the above examples are provided, other techniques known to those of ordinary skill in the art may also be used to identify one or more associated item identifiers from an identifier; thus, present disclosure is not limited to the examples provided.

In certain embodiments, shopping assistant 110 may identify the item for purchase at step 750 by calculating a similarity score based on how similar one or more identified items are to one or more attributes (e.g., text, sound, images, or the like associated with an item) identified in the content of the received message. Shopping assistant 110, in some embodiments, may then choose an item based on the calculated similarity score. For example, if the message includes an image, shopping assistant 110 may calculate a similarity score by matching the image to a second image among a plurality of images. Shopping assistant 110 may match one or more properties of the image, such as color saturation, number of pixels in the image, etc. In some embodiments, shopping assistant 110 may also use other techniques, such as matching a logo within the image, matching the placement of objects in the image, using optical character recognition to match text in the image, using facial recognition to match faces (e.g., action figures, people, brands information, or the like) in the images, etc. The similarity score may be represented as a vector. In some embodiments, each vector component may represent a different property (e.g., image property) and/or technique used to match between the image and a second image.

Additionally or alternatively, shopping assistant 110 may identify an item at step 750 based on a user selection. For example, shopping assistant 110 may transmit a message to client device 140 providing a list of suggested items. Shopping assistant 110 may determine the list of suggested items based on choosing items whose calculated similarity score is above a predetermined threshold. In some embodiments, shopping assistant 110 may provide ranked items to client device 140 based on each item's calculated similarity score. Shopping assistant 110 may then receive a selection of an item from the ranked items from client device 140.

Figure 8:
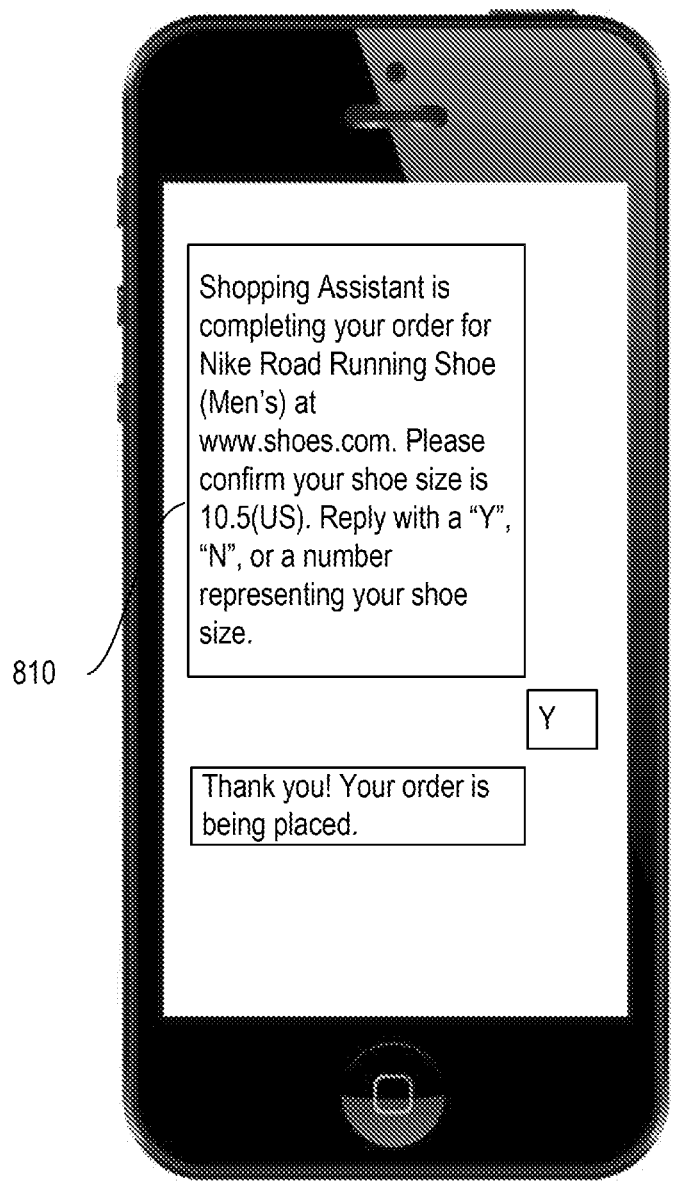
FIG. 8 is an illustration of a client device user interface, consistent with disclosed embodiments.

FIG. 8 is an illustration of a client device 140 displaying a user interface for interacting with the shopping assistant 110, consistent with embodiments of the present disclosure. As shown in FIG. 8, a text messaging interface 810 on the client device 140 displays a text message sent by shopping assistant 110 to client device 140, requesting further information to configure the purchase transaction (e.g., as discussed above with respect to step 660). For example, shopping assistant 110 may be assisting the user in purchasing a running shoe from an e-commerce merchant, and determines that the user's shoe size is not disclosed in the user account information. In order to complete the transaction, shopping assistant 110 transmits a message requesting the required information from the user. As shown in FIG. 8, the user responds with the required information to complete the transaction.

In some embodiments, shopping assistant 110 may be implemented as a browser extension (e.g., a Chrome browser extension) for mobile and desktop browsers. For example, the browser extension may include a button that may be selected to trigger process 600 (e.g., steps 620-670). In some embodiments, shopping assistant 110 may be implemented as a mobile software application, or an app extension enabling the user to access and interface with the shopping assistant 110.

In some embodiments, some or all of the logic for the above-described techniques may be implemented as a computer program, as an application, or as a plug-in module or sub-component of another application. The described techniques may be varied and are not limited to the examples or descriptions provided. In some examples applications may be developed for download to mobile communications and computing systems, e.g., laptops, mobile computers, tablet computers, smartphones, etc., being made available for download by the customer either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified or combined, and/or steps may be added or deleted.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:
1. A user device, comprising:
one or more memory devices storing instructions; and
one or more processors configured to execute the instructions to perform operations comprising:

obtaining (i) an image depicting an item, and (ii) account information associated with a user of the user device;
determining, based on the image, a plurality of merchants from which the item is available for purchase;
selecting, based on the account information, a merchant from the plurality of merchants;
identifying, based on the selection, a search field on a website associated with the merchant;
providing, via the search field, data associated with the item to the website to obtain results related to the item;
identifying the item from the results; and
configuring a purchase of the identified item from the merchant based on the account information.

2. The user device of claim 1, wherein the operations further comprise:
extracting, via a first convolutional neural network, machine learning features from historical purchase information of the user, wherein the account information associated with the user comprises the historical purchase information, wherein the first convolutional neural network is configured to (i) take, as input, the historical purchase information of the user, and (ii) output the machine learning features; and
extracting, via a second convolutional neural network, user preferences associated with the user, wherein the second convolutional neural network is configured to (iii) take, as input, the machine learning features, and (iv) indications of the user preferences, wherein configuring the purchase of the identified item from the merchant based on the account information comprises:
configuring the purchase of the identified item from the merchant based on at least one of the user preferences.

3. The user device of claim 1, wherein the operations further comprise:
extracting, via a convolutional neural network, one or more machine learning features of the item depicted in the image;
determining a plurality of similarity scores based on a comparison of the image and each image from a plurality of images stored in a database, wherein the comparison identifies similarities between the one or more machine learning features of the item and features of a corresponding image from the plurality of images, wherein each image of the plurality of images depicts a respective candidate item of a plurality of candidate items;
determining a list of candidate items based on the plurality of similarity scores and a threshold, each candidate item included in the list of candidate items having a similarity score greater than the threshold; and
receiving a selection of the item from the list of candidate items, wherein determining the plurality of merchants comprises:
conducting a search for the item; and
identifying that the plurality of merchants offer the item for purchase.

4. The user device of claim 1, wherein the item is identified from the results prior to the merchant being selected, the operations comprising:
selecting an additional merchant from the plurality of merchants;
identifying a search field on a website associated with the additional merchant;
providing, via the search field on the website associated with the additional merchant, the data associated with the item to the website associated with the additional merchant to obtain additional results related to the item;
identifying the item from the additional results; and
determining that a price of the identified item from the results is less than a price of the identified item from the additional results, wherein the merchant is selected based on the price of the identified item for purchase from the merchant being less than the price of the identified item from the additional merchant.

5. A non-transitory computer-readable medium storing computer program instructions that, when executed by one or more processors, effectuate operations comprising:
determining a plurality of merchants from which an item depicted within an image is available for purchase;
selecting a merchant from the plurality of merchants;
identifying a search field in an electronic platform associated with a merchant system of the merchant;
providing, via the search field, data associated with the item to the electronic platform to obtain results related to the item;
identifying the item from the results; and
configuring a purchase of the identified item from the merchant system for a user based on account information of the user.

6. The non-transitory computer-readable medium of claim 5, wherein the account information comprises historical purchase information of the user, the operations further comprise:
extracting, via a first machine learning model, machine learning features based on the historical purchase information of the user;
extracting, via a second machine learning model, user preferences of the user based on the machine learning features; and
storing the user preferences such that the account information comprises the historical purchase information of the user and the user preferences of the user, wherein the purchase of the identified item is based on at least one of the historical purchase information or at least one of the user preferences.

7. The non-transitory computer-readable medium of claim 6, wherein:
the first machine learning model comprises a first convolutional neural network configured to take, as input, the historical purchase information of the user, and output the machine learning features; and
the second machine learning model comprises a second convolutional neural network configured to take, as input, the machine learning features, and output indications of the user preferences.

8. The non-transitory computer-readable medium of claim 5, wherein configuring the purchase of the identified item comprises:
determining one or more user preferences from the account information;
providing information related to at least one of the one or more user preferences to the electronic platform; and
completing the purchase of the identified item based on the information provided to the electronic platform.

9. The non-transitory computer-readable medium of claim 5, wherein the operations comprise:
obtaining the image depicting the item from a user device associated with the user;
determining an identifier associated with the user device based on the image; and retrieving the account information from a database based on the identifier associated with the user device.

10. The non-transitory computer-readable medium of claim 5, wherein determining the plurality of merchants comprises:
for each of a set of merchants:
extracting, via a convolutional neural network, machine learning features from a web page associated with the merchant; and
determining, via the convolutional neural network, whether the item is available for purchase from the merchant based on the extracted machine learning features, wherein the item is available for purchase from the plurality of merchants.

11. The non-transitory computer-readable medium of claim 5, wherein selecting the merchant comprises:
identifying a list of preferred merchants from the account information, wherein the merchant is selected based on the list of preferred merchants.

12. The non-transitory computer-readable medium of claim 5, wherein the item is identified from the results prior to the merchant being selected.

13. The non-transitory computer-readable medium of claim 5, wherein selecting the merchant comprises:
identifying a search field on an electronic platform associated with an additional merchant of the plurality of merchants;
providing, via the search field, the data associated with the item to the electronic platform associated with the additional merchant to obtain additional results related to the item; and
identifying the item from the additional results, wherein the merchant is selected based on a price of the identified item from the results being determined to be less than a price of the identified item from the additional results.

14. The non-transitory computer-readable medium of claim 5, wherein the one or more processors are resident on a user device associated with the user.

15. A method implemented by one or more processors executing computer program instructions, the method comprising:
determining a plurality of merchants from which an item depicted within an image is available for purchase;
selecting a merchant from the plurality of merchants;
providing data associated with the item to a search field in an electronic platform associated with the merchant to obtain results related to the item;
identifying the item from the results; and
configuring a purchase of the identified item from the merchant for a user based on account information of the user.

16. The method of claim 15, wherein the account information comprises historical purchase information of the user, the method further comprises:
extracting, via a first machine learning model, machine learning features based on the historical purchase information of the user;
extracting, via a second machine learning model, user preferences of the user based on the machine learning features; and
storing the user preferences such that the account information comprises the historical purchase information of the user and the user preferences of the user, wherein the purchase of the identified item is based on at least one of the historical purchase information or at least one of the user preferences.

17. The method of claim 15, wherein configuring the purchase of the identified item comprises:
determining one or more user preferences from the account information;
providing information related to at least one of the one or more user preferences to the electronic platform; and
completing the purchase of the identified item based on the information provided to the electronic platform.

18. The method of claim 15, wherein determining the plurality of merchants comprises:
for each of a set of merchants:
extracting, via a convolutional neural network, machine learning features from a web page associated with the merchant; and
determining, via the convolutional neural network, whether the item is available for purchase from the merchant based on the extracted machine learning features, wherein the item is available for purchase from the plurality of merchants.

19. The method of claim 15, wherein selecting the merchant comprises:
identifying a list of preferred merchants from the account information, wherein the merchant is selected based on the list of preferred merchants.

20. The method of claim 15, wherein the item is identified from the results prior to the merchant being selected, selecting the merchant comprises:
providing the data associated with the item to a search field on an electronic platform associated with an additional merchant of the plurality of merchants to obtain additional results related to the item; and
identifying the item from the additional results, wherein the merchant is selected based on a price of the identified item from the results being determined to be less than a price of the identified item from the additional results.

* * * * *